WILLIAM MARTIEN.
Improvement in Mixing Mills.
No. 122,393.  Patented Jan. 2, 1872.
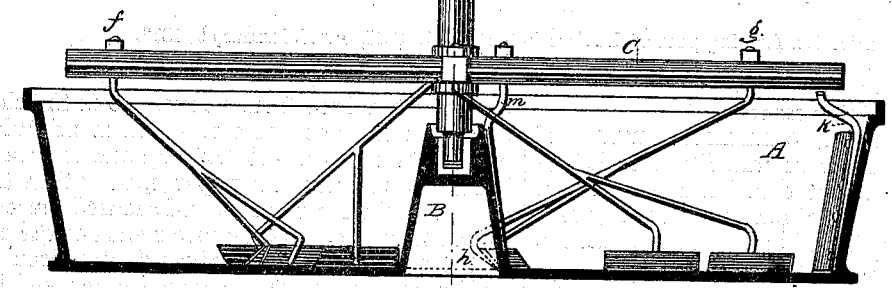
FIG. I.
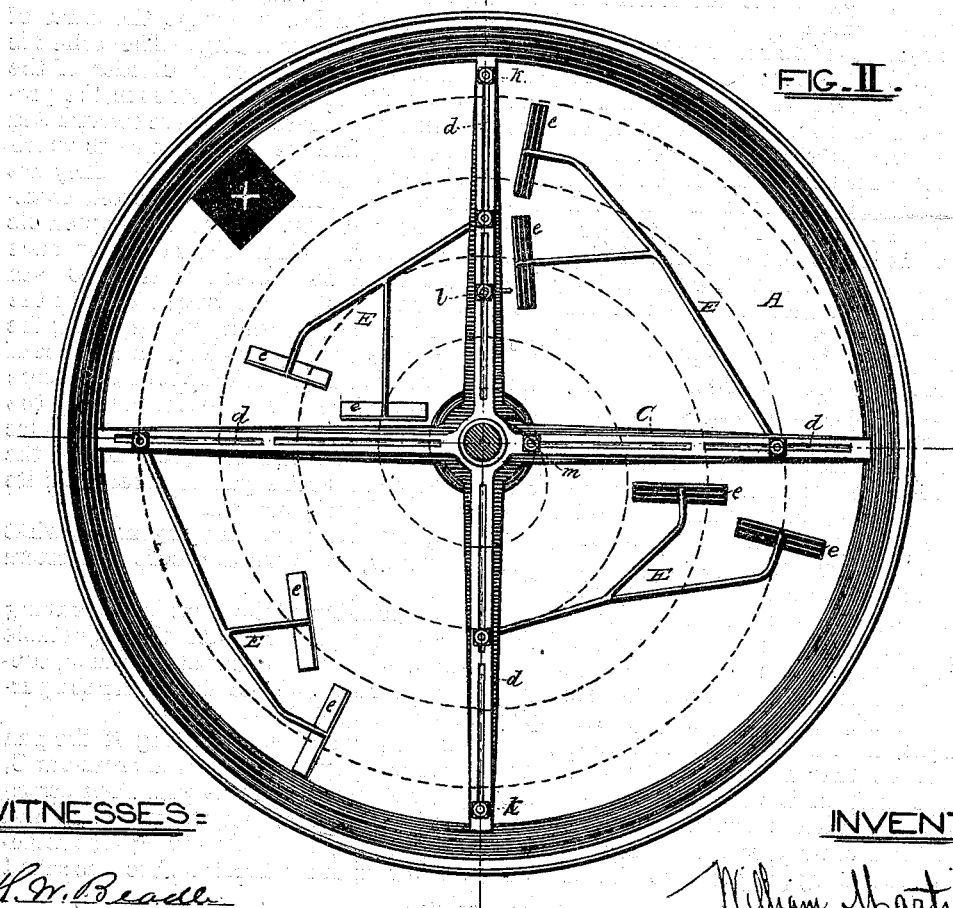
FIG. II.
WITNESSES: H. W. Beadle, H. A. Daniels
INVENTOR: William Martien by Geo. H. Howard, his Atty.

UNITED STATES PATENT OFFICE.

WILLIAM MARTIEN, OF BALTIMORE, MARYLAND.

IMPROVEMENT IN MIXING-MILLS.

Specification forming part of Letters Patent No. 122,393, dated January 2, 1872.

*To all whom it may concern:*

Be it known that I, WILLIAM MARTIEN, of the county of Baltimore and State of Maryland, have invented certain Improvements in Mixing-Machines, of which the following is a specification; and I do hereby declare that the same is a full, clear, and exact description of my said invention, reference being had to the accompanying drawing and to the letters of reference marked thereon.

My invention relates to a circular tub-shaped pan, having a step in its center formed as the frustum of a cone, within which step is caused to revolve a cross-bar having slotted arms, to which the other operating parts of the machine connect. These consist of adjustable bars and knives, the upper ends of which are inserted within the slots in the arms of the cross-bars and secured, so as to provide for their sliding therein to any distance from the center of the pan. The adjustable bars, at some distance from the ends at which they are secured to the slotted cross-bar, are forked or doubled, and each end has attached thereto a flat iron or steel scraper, resting upon the bottom surface of the pan and inclining backward therefrom at an angle of about forty-five degrees. These adjustable forked bars are placed so as to drag after the slotted cross-bar, to which they are attached, their position adapting them to the direct pulling strain to which they are subjected. They are further disposed of so that in their revolutions they unitedly describe a spiral, as indicated on Fig. I by the dotted line. The object of this disposition of the adjustable forked bars, it is apparent, is to cause the materials placed within the pan to sweep in a spiral current from the center of the same to its periphery, at which is provided an opening for their exit at the conclusion of the mixing process. The knives are also adjustable within the slots in the arms of the cross-bar, and are designed for scraping and dividing purposes as well as for mixing.

In the accompanying drawing, Figure I is a vertical section of my invention. Fig. II is a plan of the same.

A is the pan, having the step B formed as the frustum of a cone, within which rests a vertical shaft, driven from above. C is the slotted cross-bar, each arm of which is provided with slots $d$. E E are the adjustable forked bars, inserted at their upper ends within the slots $d$ of the cross-bar C, and secured thereto, as shown at $f\ g$. At the lower ends of the adjustable forked bars are riveted plate-iron or steel scrapers $e$, with sharpened edges, and inclining backward, as shown at $h$. The knives $k$ and $m$ are intended to scrape the sides of the pan and the conical step. The knife $l$ is designed to act as a cutter or divider of the materials, and also as an assistant in the process of mixing. These knives are constructed of bars of iron, flattened at that part to which the flat bar-iron pieces are riveted. They are adjustable, and secured to the slotted cross-bar C in the same manner as the adjustable forked bars E E. When the materials have been mixed and the slotted cross-bar C with its attachment is still revolving, a door in the bottom of the pan is withdrawn, exposing the opening represented by X. In consequence of the positions relatively held by the forked bars E E with reference to each other, and by the contact of the knives $k$, $l$, and $m$ with the sides and bottom of the pan and the sides of the conical step, the entire pan is cleared of its contents and cleanly scraped.

Having thus described my invention, what I claim as new, and wish to secure by Letters Patent, is—

1. A combination of the cross-bar C, having the slots $d$ in each arm, with the adjustable forked bars E E and the knives $k\ l$ and $m$, substantially as described and shown, for the purposes herein specified.

2. A mixing-machine, consisting of the pan A, the conical step B, the slotted cross-bar C, the adjustable forked bars E with their scrapers $h$ attached thereto, and the knives $k\ l$ and $m$ in combination, the whole arranged substantially in the manner hereinbefore described and shown.

WILLIAM MARTIEN.

Witnesses:
L. R. WOOLLEN,
W. H. HAYWARD.

(20)